United States Patent [19]
Bradshaw et al.

[11] 3,827,158
[45] Aug. 6, 1974

[54] SYSTEM FOR TREATING SOLID MATERIAL

[75] Inventors: Roy C. Bradshaw, Lousville, Ky.; Gus H. Hicks, P.O. Box 16161, Louisville, Ky. 40216

[73] Assignee: said Hicks, by said Bradshaw

[22] Filed: Aug. 29, 1972

[21] Appl. No.: 284,480

[52] U.S. Cl............ 34/182, 34/57 D, 34/136, 99/474, 165/120, 302/20, 432/58
[51] Int. Cl............................................ F26b 11/12
[58] Field of Search.......... 34/57 D, 57 B, 135, 136, 34/179–183, 236; 432/15, 58, 112; 165/120; 198/213; 259/2; 99/483, 514, 534, 474; 302/21, 22, 25, 50, 29, 23; 209/143

[56] References Cited
UNITED STATES PATENTS

| | | |
|---|---|---|
| 2,182,680 | 12/1939 | Rugg et al............................ 302/50 |
| 2,954,261 | 9/1960 | Taupin................................ 302/50 |
| 3,258,041 | 6/1966 | Lau..................................... 302/29 |
| 3,279,862 | 10/1966 | Hubbard............................ 302/23 |
| 3,285,670 | 11/1966 | Hubbard............................ 302/23 |
| 3,315,806 | 4/1967 | Sigwart et al. ..................... 34/57 B |
| 3,751,214 | 8/1973 | Wenzel et al........................ 432/15 |

Primary Examiner—John J. Camby
Assistant Examiner—James C. Yeung

[57] ABSTRACT

A system for treating solid material by applying gas to and extracting the gas from the solid material while the solid material is being conveyed. The system includes a gas entrance conduit to which the gas is conveyed and a gas exit conduit from which the gas is drawn while the solid material is being conveyed through the conduits and through piping located on the entrance end of the gas entrance conduit, the exit end of the gas exit conduit and intermediate piping extending between the conduits.

9 Claims, 10 Drawing Figures

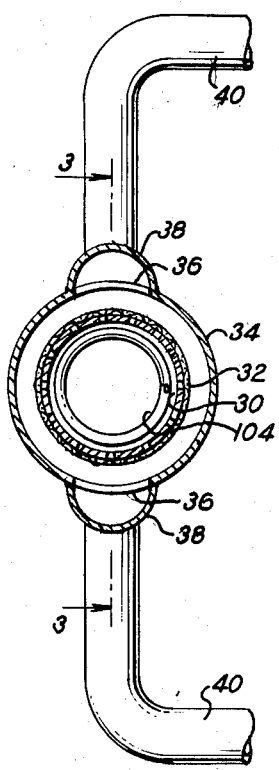
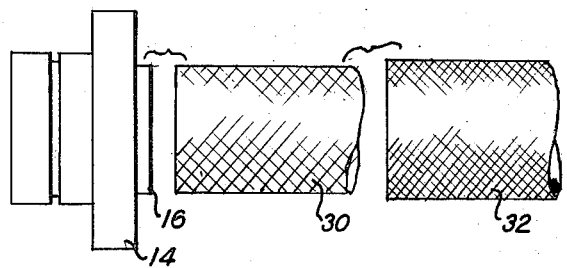
FIG. 4
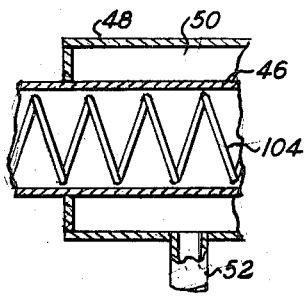
FIG. 5
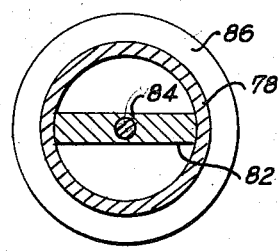
FIG. 7
FIG. 2
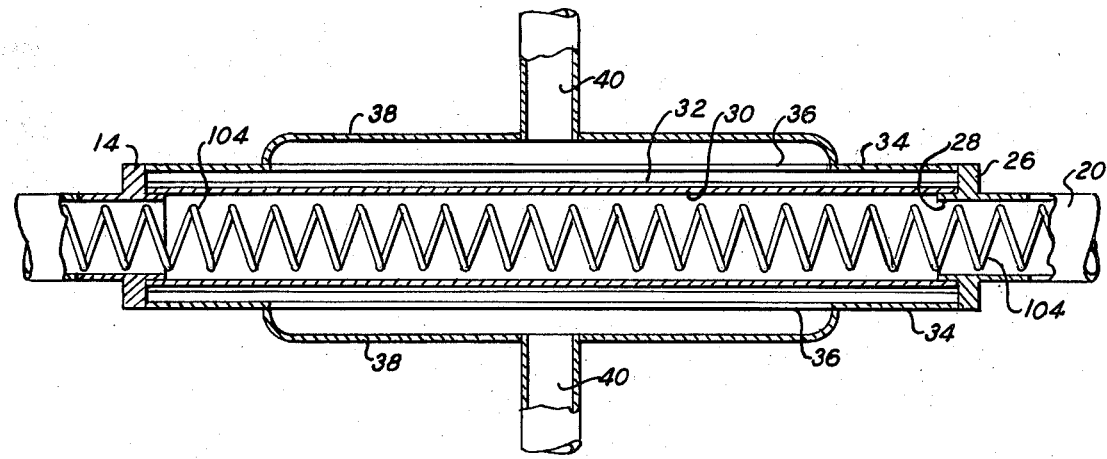
FIG. 3

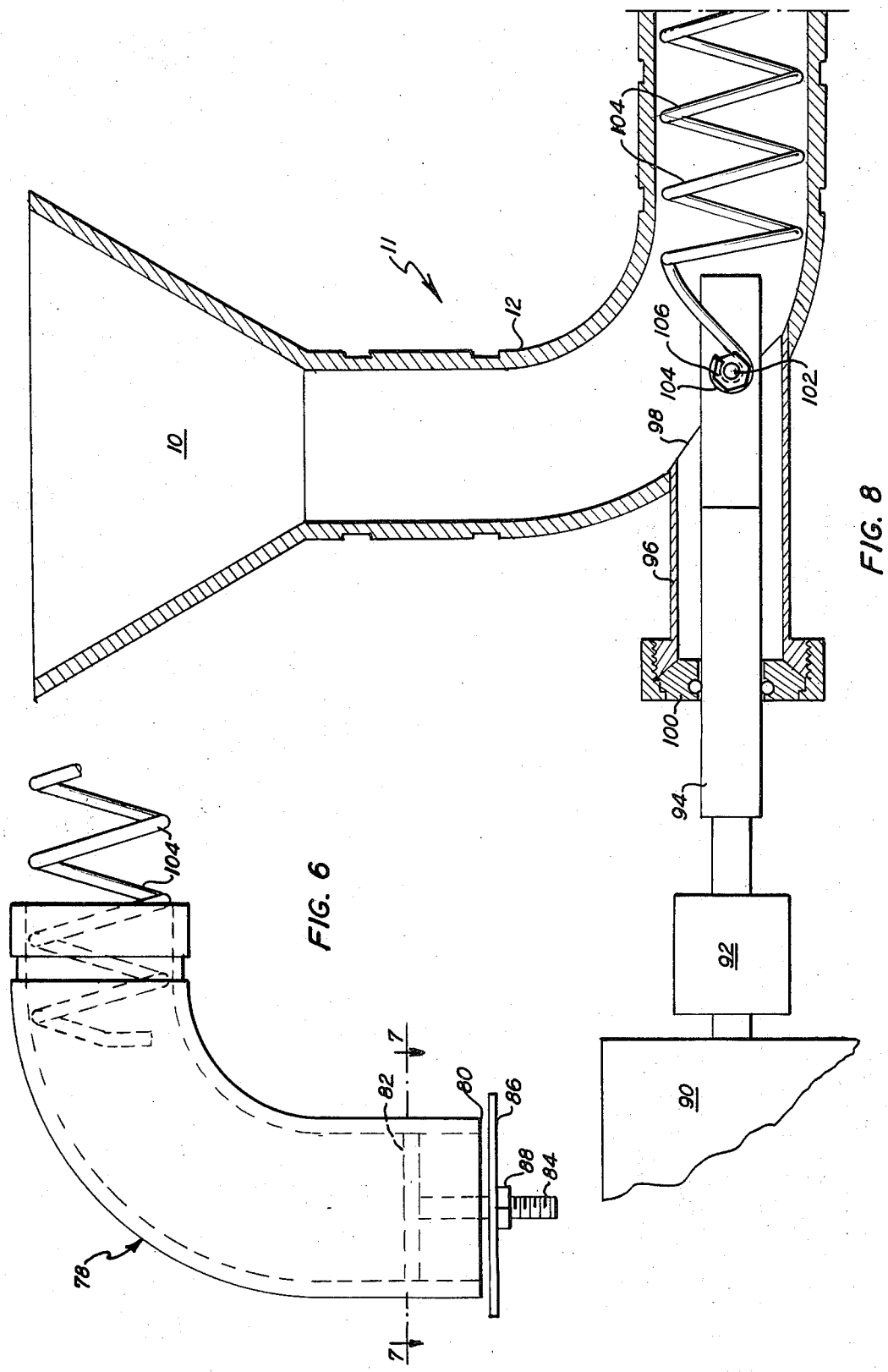

SYSTEM FOR TREATING SOLID MATERIAL

BACKGROUND OF THE INVENTION

U.S. Pat. Nos. 1,363,053 and 2,020,309 are illustrative of prior art showing arrangements for treating solid material with gas or vapor while the solid material is being conveyed through a conduit. This invention is concerned with an improved system for accomplishing this general purpose.

SUMMARY OF THE INVENTION

One aspect of this invention is concerned with an improved system for conveying the solid material through conduits so that a treating gas may be forced onto the solid material and then drawn from the solid material while the solid material is being conveyed. This is accomplished by providing spaced gas entrance and gas exit conduits through which the material is conveyed. Each conduit is formed of a tubular wall having openings of such a size as to permit the gas to flow therethrough while precluding the passage of the solid material therethrough. The opposite ends of the conduits are connected to piping. Mechanism is provided for conveying the solid material through the piping and the conduits, for conveying the gas into the entrance conduit, and for drawing from the gas exit conduit. Thus, while the solid material is being conveyed through the system, gas is first forced into the solid material to treat it and is then drawn from the solid material to remove the bulk of the gas from the solid material.

A second aspect of the invention is concerned with the construction of the conduit which enables gas or vapor either to be forced into the solid material or to be drawn from the solid material. This construction includes a manifold that is located outwardly of the conduit in gas tight communication with the conduit and a gas pipe that is in communication with the manifold through which the gas may be conveyed towards or away from the manifold. The tubular wall of the conduit extends between opposite open ends of the conduit and the opposite open ends of the conduit are in communication with the piping. This construction enables the solid material to be effectively conveyed through the conduits and enables the gas to be efficiently forced into or drawn from the solid material during such conveyance.

A third aspect of the invention is concerned with an arrangement for preventing the gas from being discharged with the solid material through exit piping at the exit end of the system. This is accomplished by locating a baffle in registry with the exit end of the piping on which the solid material accumulates to form a column extending into the exit piping to thus create a barrier against the seepage of gas through the exit piping.

BRIEF DESCRIPTION OF THE DRAWINGS

FIG. 2 is a view taken on the line 2—2 of FIG. 1;
FIG. 3 is a section taken on the line 3—3 of FIG. 2;
FIG. 4 is an exploded view of the conduit and a ferrule for mounting the conduit;
FIG. 5 is a section of a part of a conditioning station in the system;
FIG. 6 is a view of the exit end of the system showing one variant of the arrangement for discharging the solid material exiting from the system;
FIG. 7 is a section taken along the line 7—7 of FIG. 6;
FIG. 8 is a section of the entrance end of the system showing a mechanism for operating a solid material conveyor.

DESCRIPTION OF THE PREFERRED EMBODIMENTS

Figure 1:
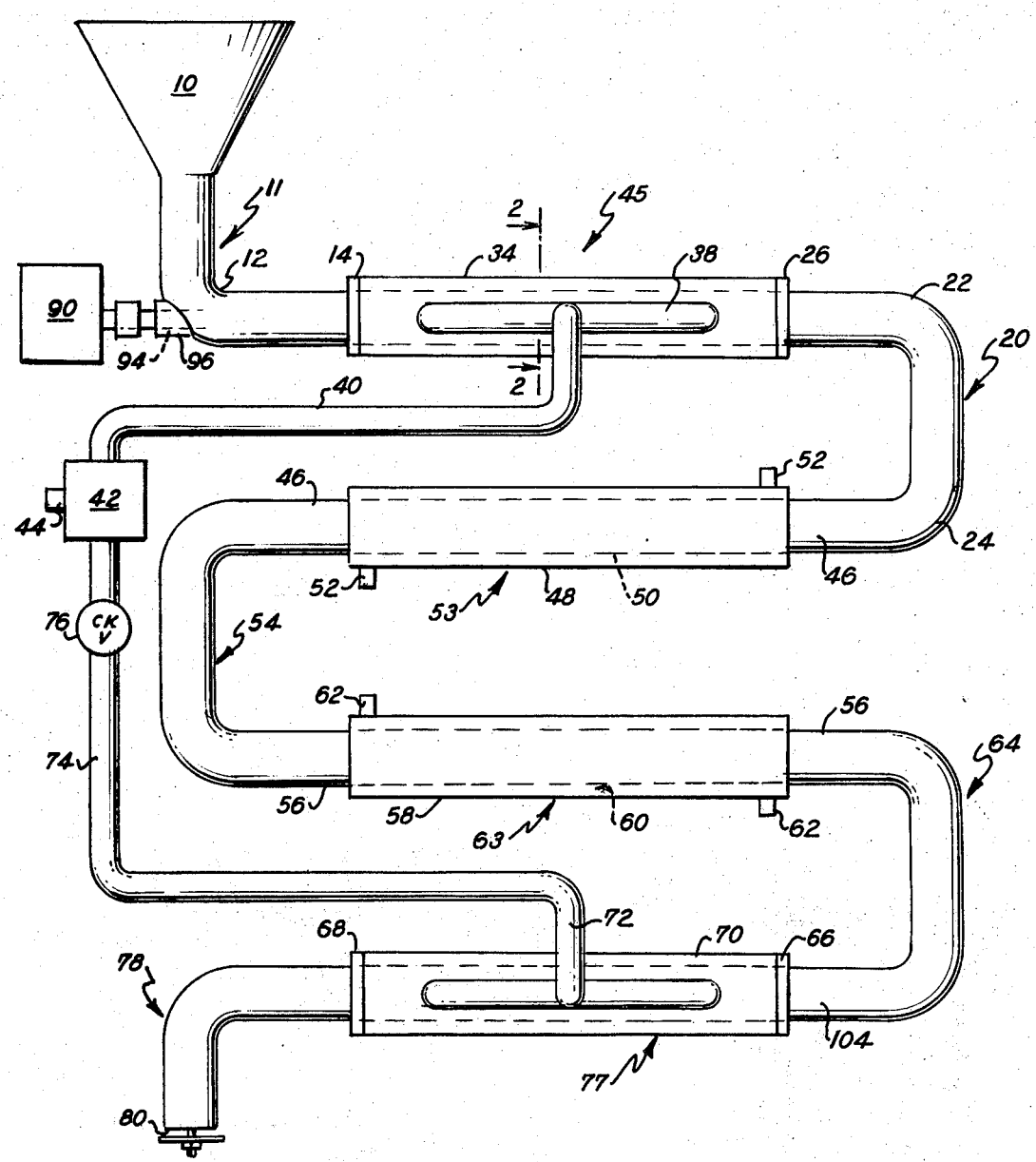
FIG. 1 is an overall view of the system.

Referring to FIG. 1, the system includes a hopper 10 in communication with entrance piping 11 that includes a pipe elbow 12. The end of the piping 11 remote from the hopper 10 is in communication with a hollow ferrule 14 (FIG. 3) that has a hollow prong 16 on the side remote from the elbow 12. Imperforate intermediate piping 20, including elbows 22 and 24, is located spacedly from the piping 11. One end of the piping 20, that is in registry with and spaced from the ferrule 14, is in communication with a hollow ferrule 26 that has a hollow prong 28 which faces the prong 16. As shown in FIGS. 2 and 3, a cylinder 30 having open ends and openings extending through the wall formed between the cylinder ends is mounted on and extends between the prongs 16 and 28. The cylinder 30 may be made of expanded metal. A filter formed of an open mesh steel cylinder 32 is mounted between the ferrules 14 and 26 and encompasses the cylinder 30. The cylinders 30 and 32 form a tubular gas entrance conduit. A pipe 34 extends between the ferrules 14 and 26 outwardly of the cylinder 32, the pipe 34 being in gas-tight connection with the ferrules 14 and 26.

Referring to FIGS. 2 and 3, slots 36 are formed in the pipe 34. Manifolds 38 are secured by a gas-tight connection to the pipe 34 so as to cover each slot 36, the manifolds 38 being in communication, by means of gas conveying entrance piping 40, with a circulating pump 42 that has a gas inlet 44. The members 30, 32, 34, and 38 form a gas entrance station 45.

The piping 20 is in gas tight communication with a pipe 46 (see FIG. 5) that is enveloped by a pipe 48 so as to form a chamber 50 between the pipes 46 and 48. Nozzles 52 are mounted to the pipe 48 and are in communication with the chamber 50. The members 46, 48, and 52 form a first conditioning station 53.

The pipe 46 is connected by imperforate intermediate piping 54 to imperforate pipe 56 that is enveloped by a pipe 58 to form a chamber 60 between the pipes 56 and 58 similar to the chamber 50. The connections between the pipe 46, the piping 54 and the pipe 56 are gas tight. Nozzles 62 are mounted to the pipe 58 and are in communication with the chamber 60. The members 58, 60, and 62 form a second conditioning station 63.

The pipe 56 is connected by imperforate intermediate piping 64 to a ferrule 66 that is spaced from a ferrule 68. A pipe 70 is mounted to and extends between the ferrules 66 and 68 in the same manner as the pipe 34 is mounted to and extends between the ferrules 14 and 26. The pipe 70 has slots identical to the slots 36 and exit manifolds 72, identical to the manifolds 38, cover the slots in the pipe 70. The manifolds 72 are in communication, by means of gas conveying exit piping 74 incorporating a check valve 76, with the pump 42. A pair of cylinders identical to the cylinders 30 and 32 are mounted on prongs identical to the prongs 16 and 28 so as to form a gas exit conduit that extends between the ferrules 66 and 68 inwardly of the pipe 70. The members 70 and 72 comprise a gas exit station 77.

The ferrule 68 is connected to exit piping 78 having an end 80 remote from the ferrule 68. Referring to FIGS. 6 and 7, a strap 82 is secured to the piping 78 adjacent the end 80, the strap straddling the interior of the piping 78. A bolt 84, threaded into the strap 82, extends outwardly of the piping end 80. A baffle 86 is adjustably mounted to the bolt 84 outwardly of the piping end 80 by a nut 88.

Referring to FIGS. 1 and 8, a drive mechanism in the form of a variable speed gear box 90 is connected by a coupling 92 to an output shaft 94. A sleeve 96 extends outwardly of a hole 98 in the pipe elbow 12 and extends towards the gear box 90. The output shaft 94 extends through the sleeve 96 into the interior of the pipe elbow 12, the shaft being rotatably mounted in a cap 100 that is mounted to the outer end of the sleeve 96. A bolt 102 extends through the inner end of the shaft 94 within the interior of the pipe elbow 12. An end of a helical coil spring 104 is entwined about the bolt 102 and is affixed to the shaft 94 by a nut 106. The spring 104 extends from the bolt 102 through the ferrule 14, the cylinder 30, the ferrule 26, the piping 20, the pipe 46, the piping 54, the pipe 56, the piping 64, the ferrule 66, the cylinder within the pipe 70 identical to the cylinder 30, and the ferrule 68 into the piping 78 (see FIG. 6).

In the use of the system, gear box 90 is operative to rotate the output shaft 94, the output shaft 94 rotating the coil spring 104 through its entire length. A gas is pumped by the pump 42 from the pump inlet 44 through the piping 40, the manifolds 38, and the cylinders 30 and 32 into the interior of the cylinder 32. The check valve 76 is so constructed as to only permit flow of gas through the piping 74 in the direction of the pump 42. The pump 42 is so constructed as to apply a suction pressure in the piping 74 towards the pump 42. The gas entering the interior of the cylinder 32 passes from the cylinder 32 through the piping 20, the pipe 46, the piping 54, the pipe 56, and the piping 64 to the interior of the cylinder within the pipe 70 that is identical to the cylinder 30. From this cylinder within the pipe 70, the gas is drawn by the suction pressure of the pump 42 through the cylinders within the pipe 70 that are identical to the cylinders 30 and 32, the piping 74 and the check valve 76 back to the pump 42 from which the gas may be forced through the piping 40 to be recirculated in the system.

The solid material to be processed is deposited in the hopper 10 and gravitates down the piping 11 into the path of the rotating coil spring 104. The spring 104 is so convoluted and is rotated in such a direction that it conveys the solid material through the system from the piping 11 to the piping end 80. From the piping end 80, the material is discharged onto the baffle 86 from which it flows into a suitable receptacle (not shown). The gas entering the system at the gas entrance station 45 passes through the cylinders 30 and 32 into contact with the material, the cylinders 30 and 32 forming the gas entrance conduit being so constructed as to permit the gas to pass therethrough while precluding the passage of the solid material therethrough. The gas and solid material flows together between the gas entrance station 45 and the gas exit station 77, the gas being drawn off by the suction in the piping 74 through the gas exit conduit at the gas exit station 77. The gas exit conduit in the gas exit station having the construction of the cylinders 30 and 32 permits the gas to exit from the system at the gas exit station while precluding the exiting of the solid material at this station. The solid material flowing out of the piping end 80 onto the baffle 86 tends to form a column of the solid material on the disc that extends into the piping 78 to thus form a barrier to prevent any gas that may not have been drawn off at the gas exit station 77 from exiting through the piping end 80.

If desired, the material can be heated and/or cooled as it passes through the conditioning stations 53 and 63 by causing hot or cold liquid to flow into and out of the chambers 50 and 60 through the nozzles 52 and 62, thus enabling the liquid to circulate through the chambers.

The system has many applications in treating a solid material with a gas or vapor, as for example, in sterilizing, bleaching or fumigating. One example to which the invention has been put to use is in the sterilizing of ground black pepper which is contaminated at a level of 4,000,000 to 5,000,000 bacteria per gram, 400 to 500 coliform organisms per gram, and 400 to 500 molds and yeasts per gram. After being conveyed through the system and treated with ethylene oxide gas, the ground black pepper typically had 2,000–3,000 bacteria per gram, no coliform organisms, and no molds or yeasts. The gas entrance conduit and gas exit conduits may also be used independently of each other in other operations, such as steaming and drying.

Figure 9:
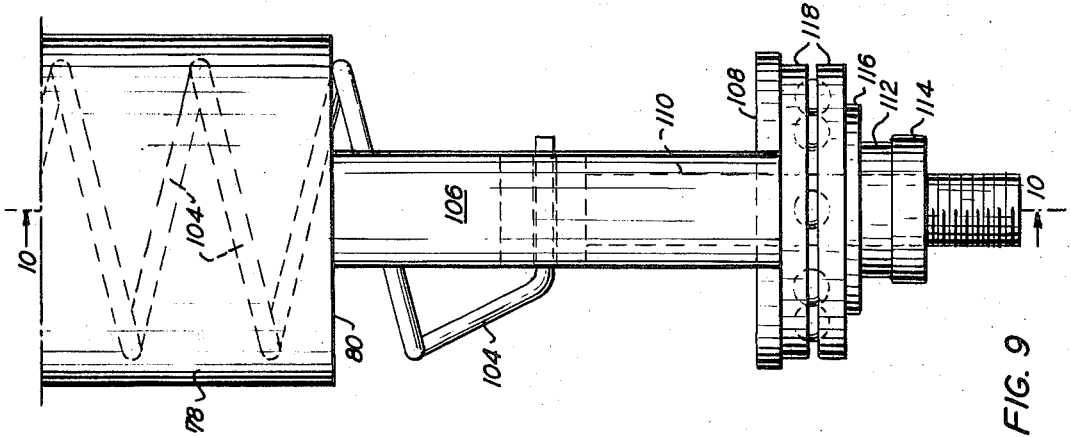
FIG. 9 is a view of the exit end of the system showing a second variant of the arrangement for discharging the solid material exiting from the system.
Figure 10:
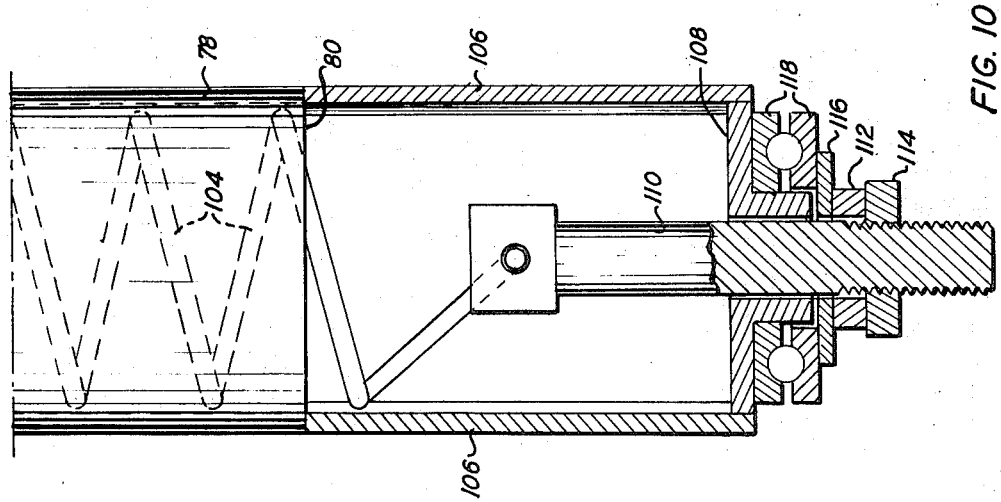
FIG. 10 is a section taken on the line 10—10 of FIG. 9.

FIGS. 9 and 10 show a different construction for the exit end of the solid from which the solid material is distributed as it is discharged, this construction having been found suitable when the solid material being treated is cocoa. Herein, a pair of spaced straps 106 are secured to the end 80 of the piping 78 so as to extend away from the piping end 80. The ends of the straps 106 remote from the piping end 80 have a baffle 108 secured thereto which rotatably receives a rod 110. The proximate end of the coil spring 104 extends outwardly of the piping end 80 and is anchored to the inner end of the rod 110. The outer end of the rod 110 projects outwardly of the baffle 108 wherein it threadedly receives lock nuts 112 and 114. The lock nuts force a washer 116 against the outer side of a thrust bearing 118, the inner side of the thrust bearing being forced against the collar 108. With this construction the exit end of the coil spring 104 extends beyond the end 80 of the piping system so that the coil spring 104 acts to convey the solid material to and beyond the piping 78. The material exiting from the piping 78 flows between the straps 106 about the periphery of the baffle 108 into a suitable receptacle (not shown). As with the baffle 86, the solid material forms a column on the baffle 108 that extends into the piping 78 to prevent seepage of gas through the piping end 80.

We claim:

1. A treatment apparatus for particulate solids comprising a treatment conduit having a plurality of reverse bends forming alternate reversely extending conduit sections, a particulate solids input means on one endmost conduit section and a particulate solids outlet means on the other endmost conduit section, jacketing means on at east one intermediate conduit section adapted to receive a heating or cooling fluid medium, a resilient spiral particulate solids conveyor element extending continuously through all of said conduit sections rotatably, power means externally of said treatment conduit coupled with said conveyor element to rotate the same on its longitudinal axis, treatment gas inlet and outlet manifold coupled in said endmost treatment conduit sections and including foraminous interface tubes separating the bore of the treatment conduit from the interiors of the manifold units, whereby treatment gas from the inlet manifold unit may enter the treatment conduit through one foraminous interface tube and may be discharged from the treatment conduit through the foraminous interface tube of the gas outlet manifold unit, said foraminous interface tubes being impervious to particulate solids being conveyed through the treatment conduit, treatment gas inlet and outlet pipes connected with and leading to and from said inlet and outlet manifold units, and gas circulating means connected with said pipes.

2. A treatment apparatus according to claim 1, and said particulate solids input means comprising an upwardly facing hopper for particulate solids connected with said one endmost conduit section upstream from said gas inlet manifold unit.

3. A treatment apparatus according to claim 1, and said conveyor element comprising an elongated coil spring, said power means including a rotary shaft coupled to one end of said spring adjacent said hopper and extending outside of the treatment conduit, and a variable speed drive for said shaft coupled therewith outside of the treatment conduit.

4. A treatment apparatus according to claim 1, and said gas inlet and outlet manifold units each comprising a slotted tubular jacket coupled in one endmost treatment conduit section and being of enlarged diameter relative to such section, a gas manifold connected with said tubular jacket in communication with a slot thereof and connected with one of said pipes, said foraminous interface tube of the manifold unit disposed inside of said jacket in spaced substantially coextensive relation therewith and said interface tube consisting of an apertured tube body and a tubular screen filter telescopically engaged over the outside of said tube body, said conveyor element extending through said apertured tube body axially.

5. A treatment apparatus according to claim 4, and opposite end fluid tight couplings connecting each manifold unit in one endmost conduit section.

6. A treatment apparatus according to claim 1, and said particulate solids outlet means comprising a baffle plate mounted across the discharge end of said other endmost conduit section, and adjustable threaded support means for the baffle plate connected with said endmost conduit section and allowing the baffle plate to have its spacing varied relative to said discharge end.

7. A treatment apparatus according to claim 1, and said particulate solids outlet means comprising a baffle plate mounted in spaced opposing relationship to the discharge end of the treatment conduit, said conveyor element extending to said discharge end and having a terminal beyond said discharge end, and a rotary shaft coupled with said terminal and having swiveled engagement with said baffle plate, whereby the conveyor element may feed particulate solids completely through and beyond the discharge end of the treatment conduit.

8. A treatment apparatus according to claim 7, and a thrust bearing forming said swiveled engagement between said rotary shaft and baffle plate.

9. A treatment apparatus according to claim 4, and said apertured tube body comprising an expanded metal body.

* * * * *